Dec. 17, 1963 SCHROEDER ET AL 3,114,335
HT BRACING APPARATUS
ed June 24, 1958
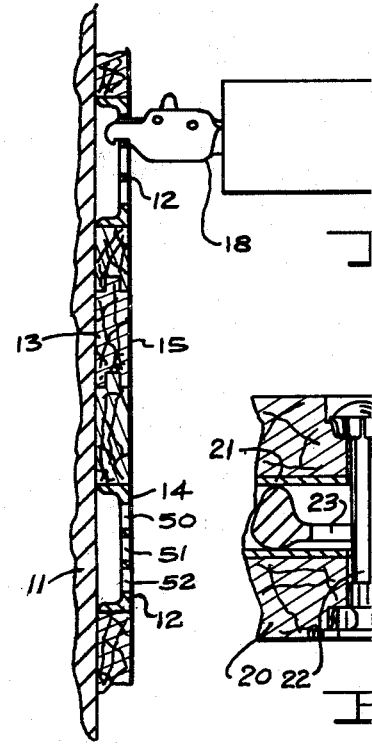
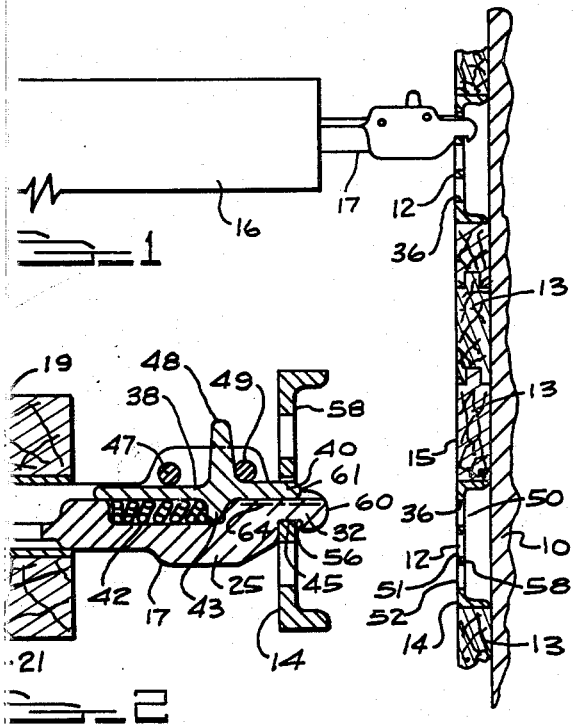
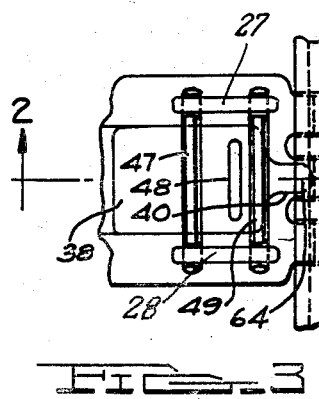
INVENTOR.
DAVID D. WOOD
ROBERT C. SCHROEDER
BY
SMITH, WILSON, LEWIS & McRAE United States Patent Office 3,114,335
Patented Dec. 17, 1963

3,114,335
FREIGHT BRACING APPARATUS
Robert C. Schroeder, Dearborn, and David D. Wood, Plymouth, Mich., assignors to Sparton Corporation, Jackson, Mich., a corporation of Ohio
Filed June 24, 1958, Ser. No. 744,120
7 Claims. (Cl. 105—369)

This application relates to freight bracing apparatus adapted for use in railroad freight cars, automotive trailers, and similar freight storage areas wherein the articles of freight must be adequately braced in their stored positions.

Objects of the invention are to provide freight bracing apparatus including two spaced parallel wall structures and a series of freight-bearing cross members extended therebetween, wherein:

(1) The cross member is securely locked in position without danger of working loose when subject to high longitudinal load conditions, (2) The cross member locking mechanism is constructed of a minimum number of parts without expensive machining operations, (3) The cross member is susceptible to use in either a vertical or horizontal position, (4) The cross member locking mechanism is constructable as a small size device whereby to enable it be confined within the outline of the cross member so as not to occupy otherwise usable freight storage space.

(5) The cross member locking mechanism is operably guided in such manner as to be free from jamming during use.

Other objects of this invention will appear in the following description and appended claims, reference being had to the accompanying drawings forming a part of this specification wherein like reference characters designate corresponding parts in the several views.

In the drawings:

FIG. 1 is a sectional view through a railroad freight car showing one embodiment of the invention installed therein.

FIG. 2 is a sectional view on line 2—2 in FIG. 3.

FIG. 3 is a fragmentary top plan view of a cross member and channel structure employed in the FIG. 1 embodiment.

FIG. 4 is an end elevational view of the structure shown in FIG. 3.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there are shown two freight car side walls 10 and 11 on which are carried a series of horizontally elongated channels 12 vertically spaced apart to receive horizontal rub boards 13 therebetween. The arrangement is such that exposed faces 14 of the channels are in substantial vertical alignment with faces 15 of the rub boards so as to present substantially flat continuous surfaces to the freight.

In order to brace and support the freight there are provided a number of cross members 16, only one of which is shown in the drawings. These cross members may be positioned beneath horizontal deckboards to support vertical loads. They may also be positioned against vertical bulkheads or directly against the freight to support horizontal loads. Such horizontal loads reach their peak when the railroad car is stopped suddenly, as for example when it strikes another car during "humping" operations.

In practice each railroad car sidewall will usually carry from nine to eighteen channels 12 spaced varying distances apart from the floor of the car up to the roof (a distance of about eight feet). Each of the cross members comprises a composite metal-wool bar or beam element 16 and metal end fittings 17 and 18. Beam element 16 includes a metal bar of Z-shaped cross section faced on two surfaces with wooden inserts 19 and 20. Each end portion of the metal bar has secured thereto a metal sleeve 21 which carries the end fitting. A number of bolts 22 are extended through the wooden inserts and metal bar at longitudinally spaced points therealong to rigidly tie the three elements together. The end ones of these bolts are extended through the metal sleeves to tie the end fittings to the cross member. As shown in FIG. 2, end fitting 17 is provided with a longitudinal slot 23 to permit limited longitudinal movement of the fitting for installation and removal from channels 12. End fitting 18 is provided with a circular hole instead of a slot so as to allow the bolt to rigidly lock the fitting to member 16.

End fitting 17 (which is similar to fitting 18 except for slot 23) comprises a forged body 25 including a web portion 26 and two upstanding flange portions 27 and 28. Three hooked-shaped support elements 30, 32 and 34 are integrally formed with body 25 so as to be insertable in and withdrawable from circular openings 36 in channels 12.

Slidably positioned on body 25 is a forged slide element 38 having a narrow end portion 40 positioned on support element 32. A compression spring 42 seats within a recess in body 25 so as to act on extension 43 of element 38 in a manner causing end portion 40 to be located against narrow neck portion 45 of support element 32. Two pins 47 and 49 are driven into fixed positions in flange portions 27 and 28 so as to closely overlie the exposed face of slide element 38. In this manner the slide element is smoothly guided for longitudinal movement without necessitating any expensive machining of body 25 or element 38. A manually-engageable handle portion 48 is integrally formed with element 38 to permit manual operation against the action of spring 42.

Installing of the cross member onto channel 12 may be effected by so manipulating the cross member as to cause support elements 30, 32 and 34 to enter through openings 36. Lateral movement of the cross member (parallel to surface 14) is then effective to place transverse latch surfaces 56 of the support elements in latching registry with the concealed face 58 of the channel. The rounded character of support element surfaces 60 and the fact that surfaces 60 are advanced to the right beyond surface 61 of end portion 40 causes the support elements to enter in and through openings 36 without manual retraction of handle 48. Thus, as fitting 17 advances toward channel 12 surfaces 60 cam into openings 36 before surface 61 has an opportunity to reach channel face 14. After the hook portions are partly through the openings surface 61 strikes face 14, but the only effect thereof is a retractive movement of element 38. When neck portions 45 are within the openings as shown in FIG. 2 element 38 snaps to the right to put end portion 40 in a "locking" position preventing separation of the fitting from channel 12.

When the cross member is in its installed position any bulging of the freight car side walls (during humping) as would tend to cause surface 56 to cam against face 58 and thereby unlatch the cross member is effectively prevented by end portion 40 of member 38. Since the forces applied by the support elements onto end portion 40 are directed at right angles to the direction of slide element movement there is no danger that the cross member can become inadvertently unlatched. This would be equally true if cross member 16 were to be utilized in a vertical position as a post element in a freight storage space.

It will be noted that in the illustrated embodiment each channel 12 is provided with three rows of openings 36, indicated generally by numerals 50, 51 and 52. The spacing between the openings in each row of openings is the same as the spacing between the openings in each row. The spacing between support elements 30, 32 and 34 is an even multiple of the opening spacing; as a result the cross member may be positioned with its support elements in row 50, in row 51, in row 52, or in all three rows (i.e. turned at right angles to its FIG. 4 position).

It will be seen that cross bar 16 is provided with four load-bearing faces 60, 61, 62, and 63. Each of these faces is spaced a slightly different distance from a central axis 64 (coinciding with the central opening 36 when the cross member is installed). Because of this spacing rotative adjustment of the cross member about axis 64 is effective to vary the position of the cross member relative to a given article of freight. This rotative adjustment is used as a fine adjustmnet of lesser magnitude than the adjustment achieved by moving the cross member laterally of its axis to different ones of openings 36.

Assume for example that is is desired to utilize the cross member to support a horizontal load against its right most face (FIG. 4). In the FIG. 4 position surface 60 will engage the freight along plane 60a. If the cross member is adjusted ninety degrees clockwise surface 63 will be positioned along plane 63a. A further ninety degree clockwise adjustment will result in surface 62 being positioned along plane 62a. Another ninety degree adjustment will result in surface 61 being positioned along plane 61a. A leftward lateral adjustment of the cross member from its FIG. 4 position to the next set of openings 36 will position surface 60 along plane 60b. It will be seen therefore that the rotative adjustment is effective as a fine adjustment for use when the freight surface is in any of the planes 61a, 62a, or 63a.

It will be noted from the drawings that the end fittings are centrally positioned with respect to the cross member so as not to project laterally beyond the planes of faces 60, 61, 62 and 63. In this manner the car width is fully usable for freight storage purposes.

Having thus described in the invention, we claim:

1. Freight bracing structure comprising spaced parallel upright support structures, each of which is provided with three parallel rows of openings; the spacing of the opening in each row being the same as the spacing between rows; a cross bar extending between the support structures; fittings carried at opposite ends of said cross bar, at least one of said fittings being mounted for free longitudinal slidable movement on the cross bar; two spaced hook-shaped support elements carried by each fitting for extension through selected ones of the openings into anti-pull out engagement with the adjacent support structure; the support element spacing being twice the opening spacing to permit rotational and lateral adjustment of the cross bar by positionment of the support elements in selected openings; and a locking member movably carried by each fitting in the space between the support elements for rectilinear insertion into and retraction from the openings to releasably lock the support elements onto the support structures.

2. Freight bracing structure comprising spaced parallel upright support structures, each of which is provided with three parallel rows of openings; the spacing of the opening in each row being the same as the spacing between rows; a cross bar extending between the support structures; fittings carried at opposite ends of said cross bar, at least one of said fittings being mounted for free longitudinal slidable movement on the cross bar; two spaced hook-shaped support elements carried by each fitting for extension through selected ones of the openings into anti-pull out engagement with the adjacent support structure; the support element spacing being twice the opening spacing to permit rotational and lateral adjustment of the cross bar by positionment of the support elements in selected openings; and a spring-urged locking member slidably carried by each fitting in the space between the support elements for insertion into and retraction from the openings to releasably lock the support elements onto the support structures.

3. Freight bracing structure comprising spaced parallel support structures, each of which is provided with three parallel rows of openings; the spacing of the opening in each row being the same as the spacing between rows; a cross bar extending between the support structures; fittings carried at opposite ends of said cross bar, at least one of said fittings being mounted for longitudinal slidable movement on the cross bar; two spaced hook-shaped support elements carried by each fitting for extension through selected ones of the openings into anti-pull out engagement with the adjacent support structure; the support element spacing being twice the opening spacing to permit rotational and lateral adjustment of the cross bar by positionment of the support elements in selected openings; one of said fittings including a web portion and two flange portions extending therefrom to define a longitudinal slideway; a slide element positioned on said slideway for insertion into and retraction from the adjacent openings to releasably lock the adjacent support elements onto the adjacent support structure; a longitudinal recess in the web portion; an extension carried by the slide element within said recess; and a spring within said recess acting on the extension to urge the slide element toward the adjacent openings.

4. A cross member end fitting comprising an elongated body member having a web portion and two flange portions extending therefrom to define a longitudinal slideway; a slide element positioned on said slideway and having a projecting end portion designed for insertion into and retraction from fixed openings; a longitudinal recess in said web portion; an extension carried by the slide element within said recess; a spring within said recess acting on the extension to urge the slide element along the body member; a plurality of hook-shaped support elements projecting from the body member in spaced parallelism with the slide element end portion; a manually-engageable handle portion extending from the slide element; and two spaced parallel pins extending between the flange portions in close adjacency to the face of the slide element for maintaining it on the slideway.

5. A cross member end fitting comprising an elongated body member having a web portion and two flange portions extending therefrom to define a longitudinal slideway; a slide element positioned on said slideway and having a projecting end portion designed for insertion into and retraction from fixed openings; a longitudinal recess in said web portion; an extension carried by the slide element within said recess; a spring within said recess acting on the extension to urge the slide element along the body member; a plurality of hook-shaped support elements projecting from the body member in spaced parallelism with the slide element end portion; a manually-engageable handle portion extending from the slide element; and two spaced parallel pins extending between the flange portions in close adjacency to the face of the slide element for maintaining it on the slideway; said pins being located in spaced apart positions on opposite sides of the manually-engageable handle portion for cooperating therewith in limting the slide element movement.

6. Freight bracing structure comprising spaced parallel upright support structures, at least one of which is provided with three parallel rows of openings; the spacing of the opening in each row being the same as the spacing between rows; a cross member extending between the support structures; spaced hook-shaped support elements extending from the cross member through selected ones of the openings; the support element spacing being an even multiple of the opening spacing to enable rotational and lateral adjustment of the cross member by positioning of the support elements in selected openings; and a locking member movably carried by the cross member for insertion in and retraction from one of said selected openings to prevent removal of the support elements from the openings; said cross member having four load-bearing faces spaced different fixed distances from an axis located midway between the support elements to enable rotary adjustment of the cross member.

7. Freight bracing structure comprising spaced parallel support structures, each provided with a series of equally spaced openings; a cross bar extending between said support structures; fittings carried at opposite ends of said cross bar, at least one of said fittings being freely slidably carried on the cross bar; a pair of hook-shaped support elements projecting from each fitting for entry into selected ones of the openings; each of said support elements being of lesser lateral dimension than any of the openings to permit it to be inserted into an opening by axial and lateral movements of the cross bar and fittings; and a spring-urged latch bolt freely movably carried on each fitting for entry into one of the openings to prevent lateral movement of the cross bar and fittings; said latch bolt terminating short of the support element ends to permit said support elements to enter into the support structure openings prior to entry of the latch bolt, whereby to prevent the bolt from obstructing the support elements in their entering movement.

References Cited in the file of this patent

UNITED STATES PATENTS

| | | |
|---|---|---|
| 2,268,394 | Hebert | Dec. 30, 1941 |
| 2,294,795 | Moses | Sept. 1, 1942 |
| 2,354,861 | Hermann | Aug. 1, 1944 |
| 2,425,875 | Hermann | Aug. 19, 1947 |
| 2,467,681 | McKinney | Apr. 19, 1949 |
| 2,497,683 | Nampa | Feb. 14, 1950 |
| 2,616,375 | Nampa | Nov. 4, 1952 |
| 2,659,319 | Hermann | Nov. 17, 1953 |
| 2,679,214 | Nampa | May 25, 1954 |
| 2,747,520 | Brown | May 29, 1956 |
| 2,769,404 | Dietrichson | Nov. 6, 1956 |
| 2,834,304 | Chapman et al. | May 13, 1958 |
| 2,837,039 | Schender | June 3, 1958 |
| 2,873,695 | Tobin | Feb. 17, 1959 |